United States Patent
Hsu

(10) Patent No.: US 7,995,137 B2
(45) Date of Patent: Aug. 9, 2011

(54) EXPOSURE COMPENSATION METHOD FOR DIGITAL IMAGE

(75) Inventor: Jung Chung Hsu, Hsinhua Township (TW)

(73) Assignee: Himax Technologies, Limited, Hsinhua Township (TW)

( * ) Notice: Subject to any disclaimer, the term of this patent is extended or adjusted under 35 U.S.C. 154(b) by 1066 days.

(21) Appl. No.: 11/414,256

(22) Filed: May 1, 2006

(65) Prior Publication Data

US 2007/0253693 A1     Nov. 1, 2007

(51) Int. Cl.
  *H04N 5/238* (2006.01)
  *H04N 3/14* (2006.01)
(52) U.S. Cl. .......................... 348/363; 382/266
(58) Field of Classification Search .......... 348/362–366; 382/266; 600/180; 250/363.09
See application file for complete search history.

(56) References Cited

U.S. PATENT DOCUMENTS

| | | | |
|---|---|---|---|
| 4,969,043 A * | 11/1990 | Pothier | 348/835 |
| 5,128,769 A * | 7/1992 | Arai et al. | 348/363 |
| 5,548,355 A * | 8/1996 | Iki | 351/212 |
| 5,677,536 A * | 10/1997 | Vickers | 250/363.09 |
| 5,926,578 A * | 7/1999 | Fukase et al. | 382/266 |
| 6,080,104 A * | 6/2000 | Ozawa et al. | 600/180 |
| 6,215,891 B1 * | 4/2001 | Suzaki et al. | 382/117 |
| 6,418,242 B1 * | 7/2002 | Maurer | 382/266 |
| 2003/0063815 A1 * | 4/2003 | Watanabe | 382/255 |
| 2008/0037870 A1 * | 2/2008 | Knee et al. | 382/173 |

* cited by examiner

*Primary Examiner* — David L Ometz
*Assistant Examiner* — Carramah J Quiett
(74) *Attorney, Agent, or Firm* — Oliff & Berridge, PLC.

(57) ABSTRACT

An exposure compensation method automatically generates an accurate exposure value to clearly show the profiles of objects in front of a black background or a white background. First, initial edge energy is derived from luminance values for pixels in a digital image having an initial exposure value. Maximum edge energy is obtained by varying an exposure compensation value for the digital image, and an optimal exposure compensation value according to the maximum edge energy is also obtained. If a difference between the maximum edge energy and initial edge energy is larger than a threshold value, a current exposure value is set to the initial exposure value compensated by the optimal exposure compensation value. Otherwise, the initial exposure value is directly designated as a current exposure value.

20 Claims, 4 Drawing Sheets

| $W_1$ | $W_2$ | $W_3$ |
|---|---|---|
| $W_4$ | $W_5$ | $W_6$ |
| $W_7$ | $W_8$ | $W_9$ |

FIG. 3(a)

| -1 | -1 | -1 |
|---|---|---|
| -1 | 8 | -1 |
| -1 | -1 | -1 |

FIG. 3(b)

EXPOSURE COMPENSATION METHOD FOR DIGITAL IMAGE

BACKGROUND OF THE INVENTION

1. Field of the Invention

The present invention relates to an exposure compensation method for a digital image, and more particularly relates to automatic analysis and adjustment of exposure levels for a digital image.

2. Description of the Related Art

Digital images from digital cameras (or digital static cameras abbreviated as DSCs) are becoming more and more popular. However, most people do not take perfect photographs. It is estimated that the majority of digital cameras have exposure shortcomings. For example, the whole digital images may be too dark or too bright so that the profiles of real objects are hardly recognized, mainly due to extreme brightness in the background.

Several conventional methods for adjusting exposure levels or values of digital images have been put forth to resolve the aforesaid exposure problem. One of the methods is to adjust the brightness average of specified green pixels to be a middle value of brightness. In an image with 8-bit color depth, the brightness (or luminance denoted by Y) values range from 0 to 255; the brightness average is preferably proximate to 127, a mid-tone luminance value, for human eyes to see a digital image having a certain exposure value. Such an exposure value can be designated as an automatic exposure value for a digital camera to capture a digital image. The corresponding brightness values of only the specified green pixels are used to calculate the brightness average, while other pixels are ignored. Furthermore, as shown in FIG. 1, the brightness values of the green pixels in the center area of the digital image are weighted with a larger factor $W_h$ (for example, equal to 2) for the calculation of the brightness average. Similarly, the brightness values of the green pixels in the outer area of the digital image are weighted with a smaller factor $W_l$ (for example, equal to 1). FIG. 2 shows a sensing unit of an image-capture device. The specific green pixels are selected from the group of all pixels $G_r$ and $G_b$. The sensing unit is a mosaic arrangement with four by four pixels. This method is easily implemented in the automatic exposure compensation circuit of a digital camera, but the designated exposure value is not adequate to clearly show real objects, especially when the background surrounding the objects is either very bright or very dark.

Several conventional methods can slightly improve the accuracy of the automatic exposure value, but more complicated calculation is needed. First, a frame is divided into a plurality of sub-regions and the luminance value of each basic mosaic cell in a sub-region is determined according to a predetermined computational formula. Each luminance value is respectively compared with a high threshold and a low threshold. When most of the luminance values are larger than the high threshold, the corresponding sub-region is too bright. In contrast, the corresponding sub-region is too dark when most of the luminance values are less than the low threshold. Finally, the automatic exposure compensation circuit can determine whether the whole frame has underexposure, proper exposure or overexposure according to the aforesaid comparison results of the sub-regions so as to adjust the automatic exposure value. However, such methods or circuits are only dependent on the luminance values so that real objects appearing in the frame are very likely to be overlooked in some special circumstances.

In conclusion, the aforesaid methods generally cannot avoid the overexposure of objects in front of a black background or the underexposure of objects in front of a white background. The users have no choice but to manually adjust the exposure value. Therefore, an automatic exposure compensation method is needed for extreme backgrounds or environments so that the objects are shown clearly in captured digital images.

SUMMARY OF THE INVENTION

An objective of the present invention is to provide an exposure compensation method for a digital image. Especially, when objects are in front of a black background or a white background, the method can automatically generate an accurate exposure value to clearly show objectss' profiles or appearances in captured digital images.

Another objective of the present invention is to provide an uncomplicated computational method for generating an optimal exposure value. The computational method is dependent on the curve of edge energy that varies with an exposure compensation value. The curve can be directly derived from current auto-focus or edge enhancement circuits so that additional hardware is not in demand.

In order to achieve the objective, the present invention discloses an exposure compensation method for a digital image. Initial edge energy is derived from luminance values for pixels in a digital image having an initial exposure value. Maximum edge energy is obtained by varying an exposure compensation value for the digital image, and an optimal exposure compensation value accompanying the maximum edge energy is also obtained. If a difference between the maximum edge energy and initial edge energy is larger than a threshold value, a current exposure value is set to the initial exposure value adjusted by the optimal exposure compensation value. Otherwise, the initial exposure value is directly designated as a current exposure value.

BRIEF DESCRIPTION OF THE DRAWINGS

The invention will be described according to the appended drawings in which:

FIG. 3(a) is a weight mask for calculating an edge value of a pixel in accordance with the present invention;

FIG. 3(b) is a weight mask for enhancing edges in a digital image;

DETAILED DESCRIPTION OF THE INVENTION

Figures 3A, 3B:
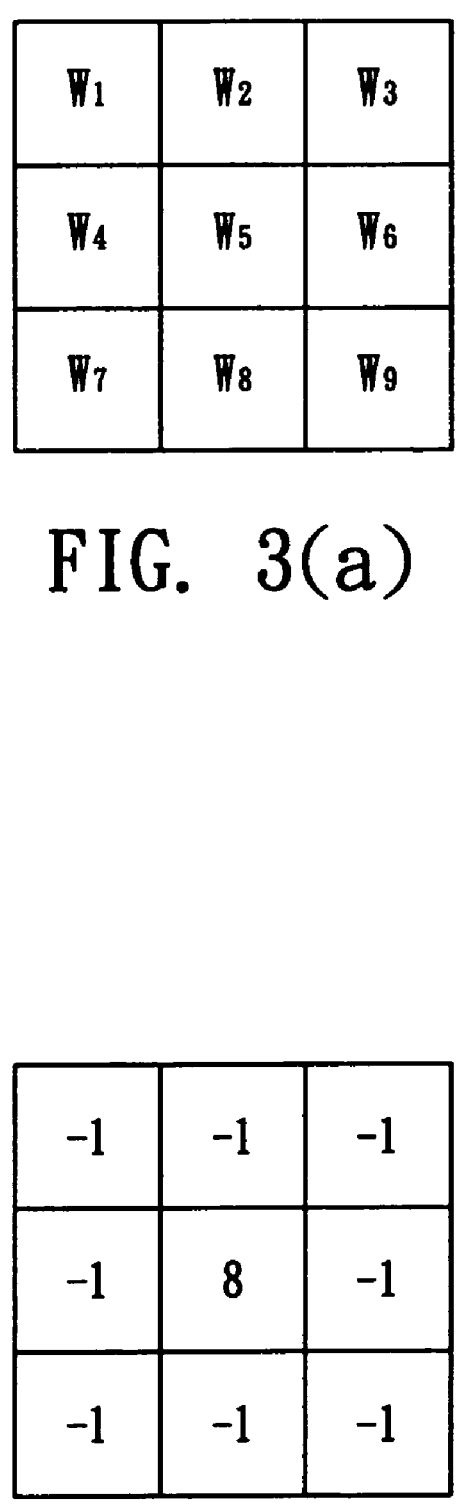

FIG. 3(a) is a weight mask for calculating an edge value of a pixel in accordance with the present invention. There are nine weights $W_1$, $W_2$, ..., $W_9$ in the weight mask. The luminance value Y of each pixel in a frame is multiplied by the center weight $W_5$, and the luminance values Y of eight pixels neighboring the center pixel are respectively multiplied by the corresponding weights. Afterward, an edge value EdgeValue$_j$ of the center pixel P$_j$ is obtained as the following formula.

$$EdgeValue_j = \sum_{i=1}^{9} Y_i W_i \quad \text{Formula (a)}$$

where Y$_i$ is the luminance value of the pixel P$_i$, and the luminance value of the center pixel P$_j$ is set to Y$_5$.

As shown in FIG. 3(b), W$_5$ is set to 8, and other weights neighboring W$_5$ are set to −1. All the weights are substituted into Formula (a), so that the EdgeValue$_j$ representing edge enhancement is easily calculated. When the edge values of the pixels in a frame are calculated, edge energy is also obtained by averaging the edge values in the forms $$\text{Edge Energy} = \text{Average}\left(\sum_{j=1}^{n} EdgeValue_j \times W_j\right) \text{ or}$$

$$\text{Edge Energy} = \text{Average}\left(\sum_{j=1}^{n} EdgeValue_j^2 \times W_j\right)$$

where n is the amount of the pixels, and the superscript 2 means the square of the EdgeValue$_j$.

Figures 1, 2:
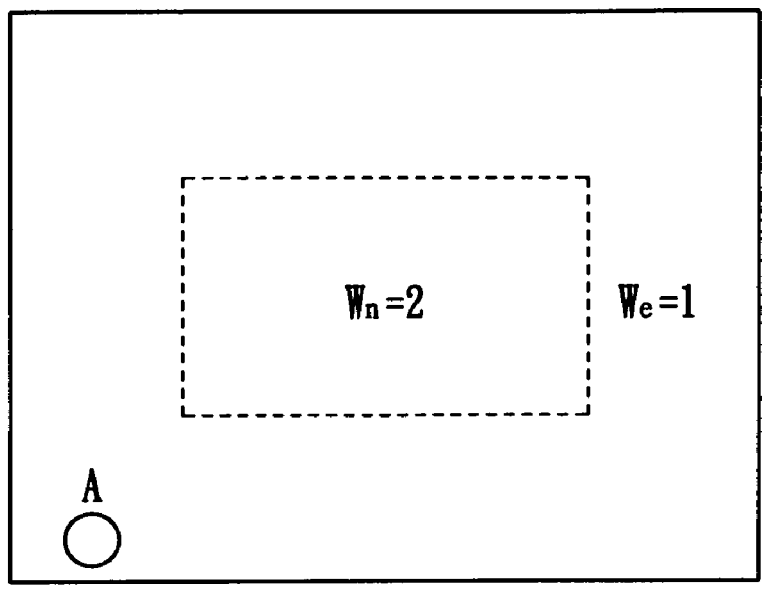
FIG. 1 is a diagram showing two regions of a digital image weighted with different factors in accordance with a conventional exposure compensation method.
FIG. 2 is a diagram showing a sensing unit of an image-capture device.
Figure 4:
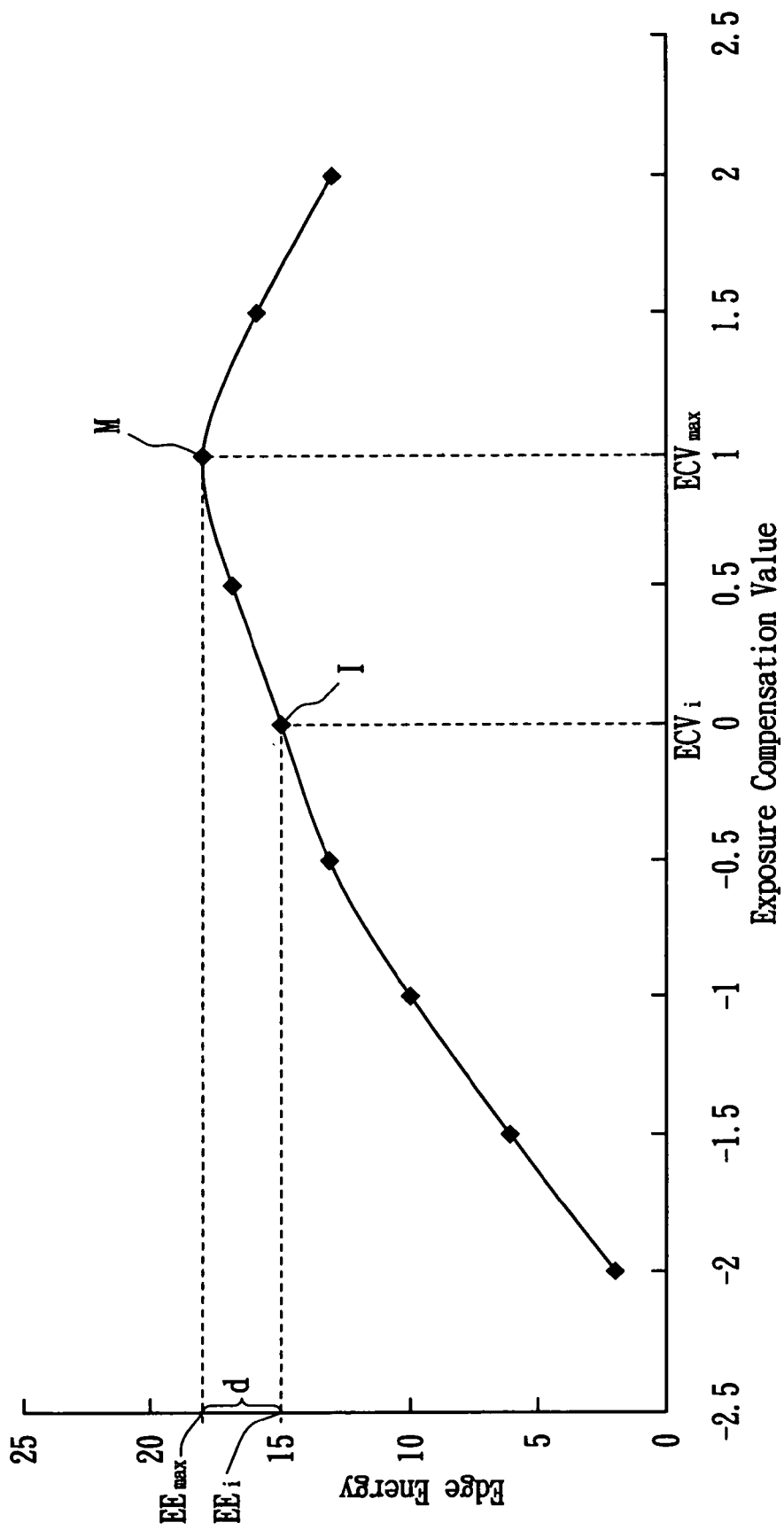
FIG. 4 is a graph showing a relationship between edge energy and an exposure compensation value.

FIG. 4 is a graph showing a relationship between edge energy and an exposure compensation value. The curve of the edge energy is obtained by varying an exposure compensation value. Generally, the corresponding coordinate value of a point I is derived from the conventional automatic exposure method. That is, initial edge energy EE$_i$ is derived from luminance values for pixels in a digital image having an initial exposure value EV$_i$. When the initial exposure value EV$_i$ is given by the conventional automatic exposure method, the initial exposure compensation value ECV$^i$ is generally set to zero. Maximum edge energy EE$_{max}$ is found at the apex M of the curve around the point I, and the exposure compensation value corresponding to the maximum edge energy EE$_{max}$ is regarded as an optimal exposure compensation value ECV$_{max}$. If the initial edge energy EE$_i$ is far from the maximum edge energy EE$_{max}$ over an allowable threshold T, a current exposure value EV is set to the initial exposure value EV$^i$ compensated by the optimal exposure compensation value ECV$_{max}$. In contrary, if the initial edge energy EE$_i$ is approximate to the maximum edge energy EE$_{max}$ within the allowable threshold T, the initial exposure value EV$_i$ is directly designated as the current exposure value EV. The current exposure value EV can make objects clearly appear in the digital image even though backgrounds behind them or environments surrounding them look like either pure white or pure black. The following formula summarizes these relationships:

if (EE$_{max}$−EE$_i$)>T, then EV=EV$_i$+ECV$_{max}$; else
EV=EV$_i$

Figure 5:
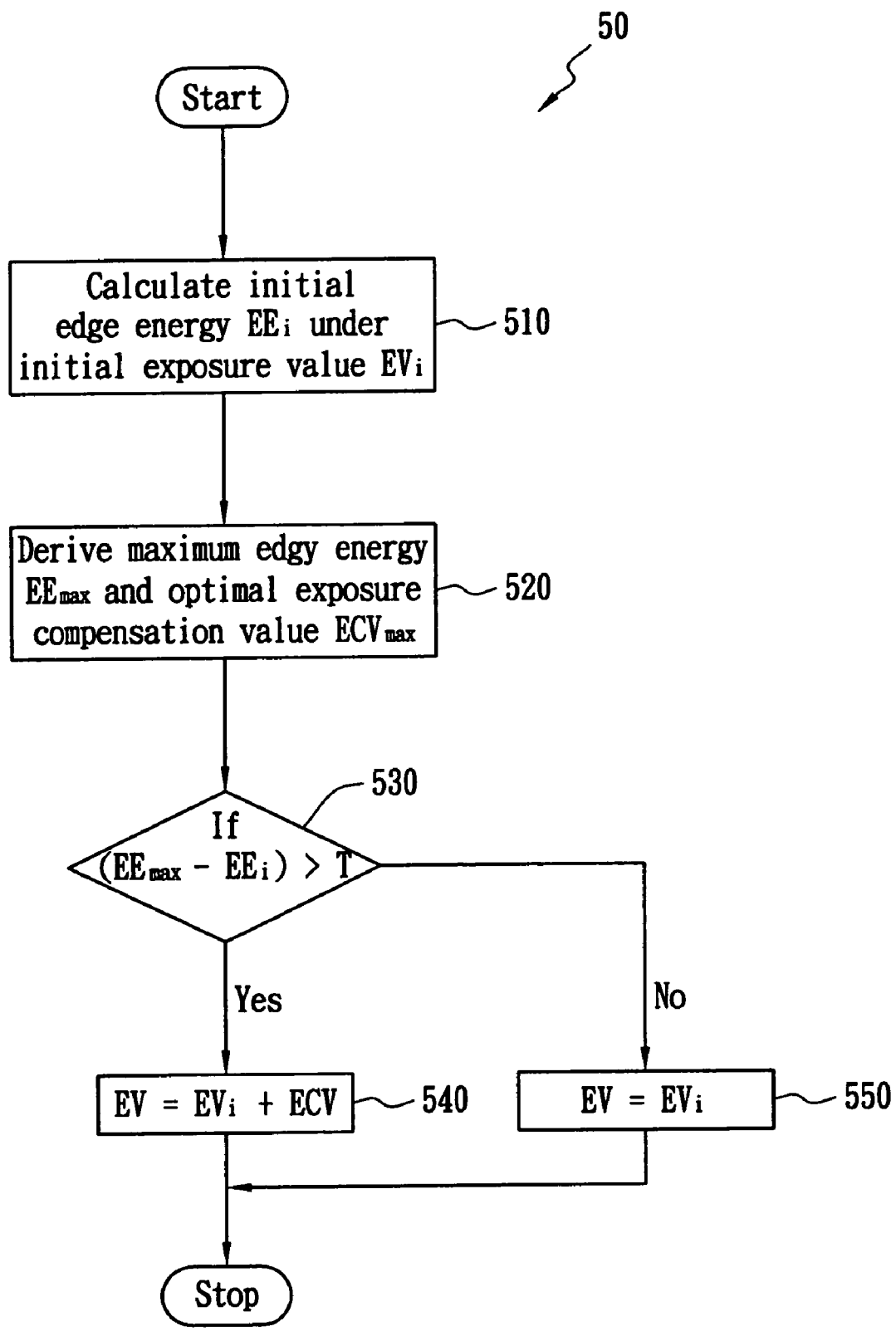
FIG. 5 is a flow chart showing an exposure compensation method in accordance with a preferred embodiment of the invention.

Furthermore, the aforesaid steps can be summarized in FIG. 5, a flow chart 50 showing the present exposure compensation method. As shown in Step 510, initial edge energy EE$_i$ is derived from luminance values for pixels in a digital image having an initial exposure value EV$_i$. Maximum edge energy EE$_{max}$ is obtained by varying an exposure compensation value for the digital image, and an optimal exposure compensation value ECV$_{max}$ corresponding to the maximum edge energy EE$_{max}$ around the initial exposure value EV$_i$ is also obtained. If a difference between the maximum edge energy EE$_{max}$ and the initial edge energy EE$_i$ is larger than a threshold value T, a current exposure value EV is set to the initial exposure value EV$_i$ compensated by the optimal exposure compensation value ECV$_{max}$. Otherwise, the initial exposure value EV$_i$ is directly designated as the current exposure value EV. Before implementing these steps, a digital camera preferably focuses on objects through a fixed focus length.

The above-described embodiments of the present invention are intended to be illustrative only. Numerous alternative embodiments may be devised by persons skilled in the art without departing from the scope of the following claims.

What is claimed is:

1. An exposure compensation method for a digital image, comprising the steps of:
   deriving initial edge energy from luminance values for pixels in the digital image having an initial exposure value, wherein edge energy is calculated by $$EE = \text{Average}\left(\sum_{j=1}^{n} \text{Edge Value}_j^2 \times W_j\right)$$

where EE is the edge energy, Average represents an average operation, n is the number of the pixels, W$_j$ is a weight and EdgeValue$_j$ is obtained by adding the luminance value of a center pixel X$_j$ multiplied by a center weight to the luminance values of pixels adjacent to the center pixel X$_j$ respectively multiplied by corresponding neighboring weights;
   obtaining maximum edge energy and an optimal exposure compensation value corresponding to the maximum edge energy;
   confirming whether a difference between the maximum edge energy and the initial edge energy is larger than a threshold value; and
   setting a current exposure value to the initial exposure value compensated by the optimal exposure compensation value if the confirmation is affirmative.

2. The exposure compensation method of claim 1, wherein the current exposure value is set to the initial exposure value if the difference is smaller than the threshold value.

3. The exposure compensation method of claim 1, further comprising the steps of:
   calculating an edge value for each of the pixels by obtaining a sum of the luminance value of the pixel multiplied by a first weight and the luminance values of the pixels neighboring the said pixel respectively multiplied by a second weight; and
   averaging the edge values of the pixels to obtain edge energy.

4. The exposure compensation method of claim 3, wherein the first weight is equal to 8 and the second weight is equal to −1.

5. The exposure compensation method of claim 1, wherein an initial exposure compensation value corresponding to the initial exposure value is set to zero.

6. The exposure compensation method of claim 1, wherein the maximum edge energy and the optimal exposure compensation value are derived by varying the exposure compensation value for the digital image.

7. The exposure compensation method of claim 1, further comprising the step of:
   focusing on objects through a fixed focus length.

8. The exposure compensation method of claim 1, wherein a curve of edge energy is depicted by varying the exposure compensation value for the digital image.

9. The exposure compensation method of claim 8, wherein the maximum edge energy and the optimal exposure compensation value are coordinate value at the apex of the curve.

10. The exposure compensation method of claim 1, wherein the EdgeValue$_j$ is calculated by $$Edge\ Value_j = \sum_i^9 Y_i W_i,$$

where $Y_i$ is the luminance value of a pixel $X_i$, $W_5$ is the center weight for the center pixel $X_j$, and $W_i$ other than $W_5$ are the neighboring weights.

11. The exposure compensation method of claim 10, wherein the center weight $W_5$ is set to 8, and the neighboring weights $W_i$ are set to −1.

12. An exposure compensation method for a digital image, comprising the steps of:
   deriving edge values based on differences of luminance values for pixels in the digital image having an initial exposure value;
   deriving an initial edge energy based on the edge values, wherein edge energy is calculated by $$EE = \text{Average}\left(\sum_{j=1}^n Edge\ Value_j^2 \times W_j\right)$$

where EE is the edge energy, Average represents an average operation, n is the number of the pixels, $W_j$ is a weight and EdgeValue$_j$ is obtained by adding the luminance value of a center pixel $X_j$ multiplied by a center weight to the luminance values of pixels adjacent to the center pixel $X_j$ respectively multiplied by corresponding neighboring weights;
   obtaining a maximum edge energy and an optimal exposure compensation value corresponding to the maximum edge energy;
   confirming whether a difference between the maximum edge energy and the initial edge energy is larger than a threshold value; and
   setting a current exposure value to an initial exposure value compensated by an optimal exposure compensation value if the confirmation is affirmative.

13. The exposure compensation method of claim 12, wherein the initial edge energy is obtained by averaging a sum of the edge values respectively multiplied by a corresponding weight.

14. The exposure compensation method of claim 12, wherein the initial edge energy is obtained by averaging a sum of the squares of each of the edge values multiplied by a weight.

15. The exposure compensation method of claim 12, wherein the current exposure value is set to the initial exposure value if the difference is smaller than the threshold value.

16. The exposure compensation method of claim 12, wherein an initial exposure compensation value corresponding to the initial exposure value is set to zero.

17. The exposure compensation method of claim 12, wherein the maximum edge energy and the optimal exposure compensation value are derived by varying an exposure compensation value for the digital image.

18. The exposure compensation method of claim 12, further comprising the step of:
   focusing on objects through a fixed focus length.

19. The exposure compensation method of claim 12, wherein a curve of edge energy is depicted by varying an exposure compensation value for the digital image.

20. The exposure compensation method of claim 19, wherein the maximum edge energy and the optimal exposure compensation value are coordinate value at an apex of the curve.

* * * * *